United States Patent [19]

Chang et al.

[11] 4,419,493
[45] Dec. 6, 1983

[54] SULFUR-VULCANIZABLE BLENDS OF ETHYLENE-VINYL ACETATE COPOLYMER ELASTOMERS AND POLYACRYLATE ELASTOMERS

[75] Inventors: Eugene Y. C. Chang, Bridgewater; Rudolf A. Behrens, Somerset, both of N.J.

[73] Assignee: American Cyanamid Company, Stamford, Conn.

[21] Appl. No.: 435,827

[22] Filed: Oct. 21, 1982

[51] Int. Cl.³ .................... C08L 13/00; C08L 51/04; C08L 31/04; C08L 33/08
[52] U.S. Cl. .................... 525/76; 525/80; 525/81; 525/82; 525/75
[58] Field of Search .................... 525/76, 80, 82, 75

[56] References Cited

U.S. PATENT DOCUMENTS 3,201,373 8/1965 Kaizerman .................... 525/329.5 X
4,202,845 5/1980 Chang et al. .................... 525/302

Primary Examiner—Carman J. Seccuro
Attorney, Agent, or Firm—William H. Calnan

[57] ABSTRACT

Polyacrylate-containing elastomers, having improved tensile strength and hardness upon vulcanization, comprise blends containing about 35 to 65 percent, by weight, of a sulfur-vulcanizable graft elastomer having a major proportion of ethyl acrylate and a minor proportion of an ethylenically unsaturated comonomer which contains a cure-site for sulfur vulcanization, grafted onto an ethylene-vinyl acetate copolymer, and about 65 to 35 percent, by weight, of a sulfur-vulcanizable polyacrylate elastomer.

20 Claims, No Drawings

SULFUR-VULCANIZABLE BLENDS OF ETHYLENE-VINYL ACETATE COPOLYMER ELASTOMERS AND POLYACRYLATE ELASTOMERS

Sulfur-vulcanizable polyacrylate elastomers are well-known; see Kaizerman, U.S. Pat. No. 3,201,373, and Vial, Rubber Chem. and Tech. 44, 344–362 (1971). However, the tensile strength and hardness of these elastomers could be improved.

Sulfur-vulcanizable graft elastomers of ethylene-vinyl acetate copolymers are disclosed by Chang and Saxon in U.S. Pat. No. 4,202,845. Such elastomers are obtained by grafting onto an ethylene-vinyl acetate copolymer, containing about 50 to 92 percent ethylene and 8 to 50 percent vinyl acetate, a mixture of monomers comprising a major proportion of one or more acrylic acid esters and a minor proportion of an ethylenically unsaturated comonomer containing a curesite for sulfur vulcanization. Such graft elastomers have good resistance to hydrocarbon oils and excellent low temperature properties.

SUMMARY OF THE INVENTION

The present invention provides polyacrylate-containing elastomers having improved tensile strength and hardness upon vulcanization, said elastomer compositions comprising blends containing about 35 to 65 percent, by weight, of a sulfur-vulcanizable graft elastomer having a major proportion of ethyl acrylate and a minor proportion of an ethylenically unsaturated comonomer which contains a cure-site for sulfur vulcanization, grafted onto an ethylene-vinyl acetate copolymer, and about 65 to 35 percent, by weight, of a sulfur-vulcanizable polyacrylate elastomer.

DETAILED DESCRIPTION OF THE INVENTION

The sulfur-vulcanizable graft elastomers of the present compositions contain about 18 to 80 percent, by weight, preferably about 20 to 60 percent, by weight, based on the weight of the grafted elastomer, of an ethylene-vinyl acetate copolymer having grafted thereon about 82 to 20 percent, by weight, preferably about 80 to 40 percent, by weight, of a mixture of a major proportion of ethyl acrylate and a minor proportion of an ethylenically unsaturated comonomer containing a cure-site for sulfur vulcanization. The ethylene-vinyl acetate copolymer, before grafting, comprises about 50 to 92 percent, by weight, ethylene, and about 8 to 50 percent, by weight, of vinyl acetate.

The ethylenically unsaturated comonomer which provides the cure-site for sulfur vulcanization may be a halogen (e.g., bromine or chlorine) containing monomer or a carbon to carbon double bond containing monomer. When the cure-site is provided by a comonomer containing carbon to carbon unsaturation (e.g., a vinyl or ethylene group) the comonomer should provide in the final graft elastomer at least about 0.2 percent, preferably about 0.2 to 5 percent, by weight, of unsaturation. When the cure-site is provided by a halogen containing comonomer, the comonomer should provide in the final graft elastomer at least about 0.2 percent, preferably about 0.2 to 4.5 percent, by weight, of halogen. Preferably, the ethylenically unsaturated comonomer which provides the cure- site to the elastomer is a halogen containing monomer. The amount of ethyl acrylate monomer used is that which is sufficient to create in the final graft elastomer the above set forth amounts of grafted ethyl acrylate.

Active halogen containing monomers which may be used include those represented by the formula:

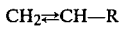

Illustrative examples of R include:

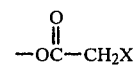

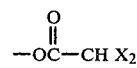

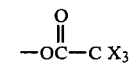

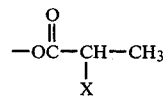

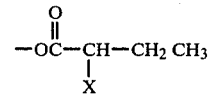

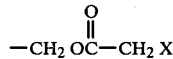

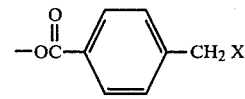

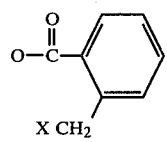

—OCH$_2$ CH$_2$ X

—OCH$_2$ CH—CH$_3$
           |
           X

O—CH$_2$—CHCH$_2$ CH$_3$
           |
           X wherein X is a halogen atom, preferably chlorine or bromine.

Ethylenicaly unsaturated comonomers which may be grafted onto the ethylene-vinyl acetate copolymers to provide carbon to carbon unsaturated cure-sites for sulfur vulcanization include such polyunsaturated monomers as allyl acrylate, crotyl acrylate, 5-ethylidene-2-norbornene, and the like. Vinyl chloroacetate is the preferred cure-site-containing grafting comonomer.

The grafted polymer segments of the elastomers of the present invention may be prepared by a grafting procedure whereby a mixture of ethyl acrylate and the cure-site-containing monomer are polymerized or grafted onto the ethylene-vinyl acetate copolymer backbone. The monomers to be grafted, along with the ethylene-vinyl acetate copolymer in powder or pellet form, are preferably first heated to about 40°–90° C. to swell the monomers into the polymer. A suitable free radical catalyst, such as tertiary butyl peroctoate, benzoyl peroxide and the like, is then added, and the monomers are polymerized at about 80° C. The polymer is then isolated, washed, and dried in a known manner.

The sulfur-vulcanizable polyacrylate elastomers which are useful in the compositions of the present invention include copolymers of a $C_1$-$C_8$ alkyl acrylate, a mixture of $C_1$-$C_8$ alkyl acrylates, or a mixture of one or more $C_1$-$C_8$ alkyl acrylates and a minor proportion (i.e., up to about 20 percent, by weight, based on the total weight of the acrylate), of an acrylate or methacrylate, and vinyl chloroacetate. Exemplary such elastomers are disclosed in Kaizerman, U.S. Pat. No. 3,201,373, hereby incorporated herein by reference. The polyacrylate elastomer preferably contains at least about 70 percent, by weight, of the $C_1$-$C_8$ alkyl acrylate, or the mixture of $C_1$-$C_8$ acrylates, or the mixture of one or more $C_1$-$C_8$ alkyl acrylates, and a minor proportion of an acrylate or methacrylate. The vinyl chloroacetate is present in an amount sufficient to produce a chlorine content in the polyacrylate elastomer of at least about 0.2 percent, preferably about 0.2 to 5 percent, and most preferably about 0.6 to 1.2 percent, by weight.

Illustrative examples of suitable $C_1$-$C_8$ alkyl acrylates include those wherein the alkyl moiety is methyl, ethyl, n-propyl, n-butyl, n-hexyl, 2-ethylhexyl, 2-methoxyethyl, and the like. Illustrative examples of suitable acrylates and methacrylates which may be used in minor proportions in said mixtures include those wherein the alkyl moiety is $C_1$-$C_8$ alkyl, 2-hydroxyethyl, 2-ethoxyethyl, 2,2-diethoxyethyl, 3-hydroxypropyl, 2-phenoxyethyl, 2-(ethyl-amino)ethyl, 2-(diethylamino)ethyl, 2-(n-hexylamino) ethyl, isobornyl, glycidyl, tetrahydrofurfuryl, dicyclopentenyl, and the like. Preferably, the acrylate ester is a mixture of ethyl acrylate and n-butyl acrylate.

The preferred polyacrylate elastomer contains about 77 percent ethyl acrylate, 17 percent n-butyl acrylate, and 6 percent vinyl chloroacetate.

As aforesaid, the compositions of the present invention comprise blends containing about 35 to 65 percent by weight of the sulfur-vulcanizable graft elastomer and about 65 to 35 percent by weight of the sulfur-vulcanizable polyacrylate elastomer. Preferably, the blends contain equal amounts, by weight, of the graft elastomer and the polyacrylate elastomer.

The compositions of the invention may be compounded by conventional means, e.g., by Banbury mixer or a two-roll rubber mill. Sulfur, sulfur donors, accelerators, antioxidants, carbon black, other fillers and additives, as are commonly employed in the vulcanization of acrylic elastomers and the like, may be used in the vulcanization system; notably, the methods of Mihal, U.S. Pat. No. 3,458,461, and Behrens, U.S. Pat. No. 3,506,624, the relevant portions of which are hereby incorporated herein by reference, may be used to vulcanize the elastomers. The compounded vulcanized elastomer may then be fabricated into useful articles by conventional means, e.g., by compression molding, extrusion, and the like.

The following non-limiting examples illustrate the present invention. All parts and percentages are by weight unless otherwise indicated.

EXAMPLE 1

A slurry of 50 grams of a copolymer of ethylene and vinyl acetate, containing 75% ethylene and 25% vinyl acetate, 44 grams of ethyl acrylate, 6 grams of vinyl chloroacetate, and 500 grams of water was stirred at 70° C. for one hour to swell the polymer pellets. Tertiary butyl peroctoate (0.5 gram) was then added to the reaction mixture and stirring continued at 70°-80° C. for 3 hours. The insoluble graft copolymer was then isolated by filtration, washed with water, and dried. The graft copolymer product contained about 37.5% ethylene, 12.5% vinyl acetate, 44% ethyl acrylate, and 6% vinyl chloroacetate.

A portion of the graft copolymer (50 grams) was then compounded on a standard two-roll rubber mill with 50 grams of a copolymer of ethyl acrylate and vinyl chloroacetate, containing 94% ethyl acrylate and 6% vinyl chloroacetate, 60 grams of Regal 300 carbon black, 1.5 grams of stearic acid, 2.0 grams of N,N'-di-2-naphthyl-p-phenylenediamine, 0.4 gram of sulfur, and 8.0 grams of a 50% blend of sodium 2-ethyl-hexanoate on an inert carrier. The compounded composition was cured into a 6 inch×6 inch×0.0625 inch test sheet (all other test sheets hereinafter referred to having the same dimensions) by compression molding at 350° F. for 15 minutes, and post-cured in an oven at 350° F. for 4 hours. The physical properties of the resulting sheet were as follows:

| Hardness, Shore A | 88 |
|---|---|
| Tensile strength, psi | 2120 |
| Elongation at break, % | 145 |

EXAMPLE 2

The compounding procedure of Example 1 was repeated in every detail except that 50 grams of a copolymer containing 94% ethyl acrylate and 6% vinyl chloroacetate was substituted for the 50 grams of the graft copolymer. The physical properties of the test sheet obtained after curing the resulting composition are shown below:

| Hardness, Shore A | 75 |
|---|---|
| Tensile strength, psi | 1900 |
| Elongation at break, % | 125 |

Comparison of the above results with those obtained in Example 1 shows that the blended composition of Example 1 is superior in these properties.

EXAMPLE 3

A slurry of 165 grams of a copolymer of 75 percent by weight of ethylene and 25% by weight of vinyl acetate, 120 grams of ethyl acrylate, 15 grams of vinyl chloroacetate, 0.12 gram of dodecyl mercaptan, and 1100 grams of 5% by weight solution of sodium chloride in water was stirred at 60°-62° C. for one hour to swell the polymer pellets. At this point, 1.2 grams of tertiary butyl peroctoate was added to the slurry and the reaction mixture was stirred at 62°-62.5° C. for 50 minutes. The temperature was then raised to 65° C. and maintained thereat for 4 hours. CYANOX ® 8 Antioxidant (0.6 gram; American Cyanamid Company) was then added thereto and the reaction mixture stirred at 65° C. for an additional 30 minutes. The insoluble product was then isolated by filtration, washed with water, and dried to obtain 270 grams (90% of theory) of grafted polymer containing about 41.25% ethylene, 13.75% vinyl acetate, 40% ethyl acrylate, and 5% vinyl chloroacetate.

A portion of the above graft copolymer (50 grams) was compounded on a standard two-roll mill with 50 grams of a copolymer containing 77% ethyl acrylate, 17% n-butyl acrylate, and 6% vinyl chloroacetate, 50 grams of Regal 300 carbon black, 1.0 gram of stearic acid, 2.0 grams of N,N'-di-2-naphthyl-p-phenylenediamine, 0.25 gram of sulfur, and 8.0 grams of a 50% blend of sodium 2-ethyl hexanoate on an inert carrier. The compounded composition was then compression molded and postcured as described in Example 1. The resultant test sheet exhibited the following properties:

| Hardness, Shore A | 84 |
| Tensile strength, psi | 2215 |
| Elongation at break, % | 275 |

EXAMPLE 4

The procedure of Example 3 was followed in every detail except that 50 grams of a copolymer of 77% ethyl acrylate, 17% n-butyl acrylate, and 6% vinyl chloroacetate was substituted for the 50 grams of the graft copolymer. The physical properties of the resultant test sheet were as follows:

| Hardness, Shore A | 71 |
| Tensile strength, psi | 1940 |
| Elongation at break, % | 250 |

Comparison of the above results with those obtained in Example 3 shows that the blended composition of Example 3 is superior in all of these properties.

EXAMPLE 5

A slurry of 100 grams of a copolymer of ethylene and vinyl acetate, containing 82% ethylene and 18% vinyl acetate, 93.4 grams of ethyl acrylate, 6.6 grams of vinyl chloroacetate, and 1100 grams of water containing 10% sodium chloride was stirred at 70° C. to swell the polymer. Tertiary butyl peroctoate (0.8 gram) was then added to the reaction mixture and after stirring for 30 minutes the temperature was raised to 80° C. and held thereat for 1 hour. The insoluble graft copolymer was then isolated by filtration, washed with water, and dried to obtain 192 grams of a product containing 41% ethylene, 9% vinyl acetate, 46.5% ethyl acrylate, and 3.3% vinyl chloroacetate.

A portion of the graft copolymer (50 grams) was compounded on a standard two-roll rubber mill with 50 grams of a copolymer of 77% ethyl acrylate, 17% n-butyl acrylate, and 6% vinyl chloroacetate as described in Example 3 and the compounded composition was then compression molded and post-cured as described in Example 1. The resultant test sheet exhibited the following properties:

| Hardness, Shore A | 83 |
| Tensile strength, psi | 2025 |
| Elongation at break, % | 230 |

Comparison of the above results with those obtained in Example 4 shows that the blended composition of Example 5 is superior in hardness and tensile strength.

What is claimed is:

1. A sulfur-vulcanizable elastomer composition comprising:
   (A) from about 35 to 65 percent, by weight, of a graft elastomer comprising about 18 to 80 percent, by weight, of a copolymer of ethylene and vinyl acetate having grafted thereon about 82 to 20 percent, by weight, of a mixture of a major proportion of ethyl acrylate and a minor proportion of an ethylenically unsaturated comonomer containing a cure-site for sulfur vulcanization, said copolymer of ethylene and vinyl acetate comprising, before grafting, about 50 to 92 percent, by weight, of ethylene and about 8 to 50 percent, by weight, vinyl acetate, and
   (B) from about 65 to 35 percent, by weight, of a sulfur vulcanizable polyacrylate elastomer comprising (1) a $C_1$-$C_8$ alkyl acrylate, a mixture of $C_1$-$C_8$ alkyl acrylates, or a mixture of one or more $C_1$-$C_8$ alkyl acrylates and up to about 20%, by weight, based on the total weight of acrylate, of an acrylate or methacrylate, and (2) vinyl chloroacetate.

2. The composition of claim 1 wherein (1) comprises at least about 70%, by weight, of the polyacrylate elastomer.

3. The composition of claim 2 wherein the amount of the ethylene-vinyl acetate copolymer, as a percentage of the graft elastomer, ranges from about 20 to 60 percent, by weight, the amount of ethyl acrylate and ethylenically unsaturated comonomer containing said cure-site ranges from about 40 to 80 percent by weight, and the vinyl chloroacetate is present in the polyacrylate elastomer in an amount sufficient to provide a chlorine content therein of at least about 0.2 percent by weight.

4. The composition of claim 3 wherein the vinyl chloroacetate is present in the polyacrylate elastomer in an amount sufficient to provide a chlorine content therein of about 0.2 to 5 percent, by weight.

5. The composition of claim 1 wherein the ethylenically unsaturated comonomer containing a cure-site for sulfur vulcanization is a halogen-containing compound.

6. The composition of claim 1 wherein the ethylenically unsaturated comonomer containing a cure-site for sulfur vulcanization is a polyunsaturated monomer, and it is present in an amount sufficient to provide in the final graft elastomer at least about 0.2%, by weight, of unsaturation.

7. The composition of claim 5 wherein the halogen content of said grafted elastomer is at least about 0.2 percent by weight.

8. The composition of claim 7 wherein the halogen-containing compound is vinyl chloroacetate.

9. The composition of claim 6 wherein the ethylenically unsaturated comonomer is 5-ethylidene-2-norbornene.

10. The composition of claim 1 wherein (1) is ethyl acrylate, or a mixture of ethyl acrylate and n-butyl acrylate.

11. The composition of claim 1 wherein the polyacrylate elastomer comprises a mixture of ethyl acrylate and n-butyl acrylate, and vinyl chloroacetate.

12. The composition of claim 3 wherein the polyacrylate elastomer comprises about 77 percent, by weight, ethyl acrylate, about 17% n-butyl acrylate and about 6% vinylchloroacetate.

13. The composition of claim 2 wherein the composition comprises about 50 percent, by weight, of (A) and about 50%, by weight, of (B).

14. The composition of claim 3 wherein the composition comprises about 50 percent, by weight, of (A) and about 50 percent, by weight, of (B).

15. A vulcanized elastomer composition of claim 1.

16. A vulcanized elastomer composition of claim 2.

17. A vulcanized elastomer composition of claim 3.

18. A vulcanized elastomer composition of claim 8.

19. A vulcanized elastomer composition of claim 12.

20. A vulcanized elastomer composition of claim 14.

* * * * *